Dec. 14, 1937.  A. H. PAYSON ET AL  2,102,164
HEAT INSULATED RECEPTACLE
Filed July 27, 1935

INVENTORS
ARTHUR H. PAYSON
CHARLES O. DUEVEL JR.
by Adolph A. Thomas
ATTORNEY

Patented Dec. 14, 1937

2,102,164

UNITED STATES PATENT OFFICE 2,102,164

HEAT INSULATED RECEPTACLE

Arthur H. Payson and Charles O. Duevel, Jr., Norwich, Conn., assignors to The American Thermos Bottle Company, Norwich, Conn., a corporation of Ohio Application July 27, 1935, Serial No. 33,544

4 Claims. (Cl. 220—15)

Our invention relates to heat-insulated receptacles of the double-walled type, and its object is to provide a small tub especially adapted to hold ice cubes and the like in reserve. For this purpose, a double-walled heat-insulated container of glass (or other suitable material) is suspended in an outer tub-shaped casing by means of a compressed rubber gasket, which is seated in a groove at the top of the casing. The container is inserted through the open top of the casing, and as it is pushed in it compresses the gasket, which remains in permanent pressure contact with the adjacent wall of the container and thereby supports the latter. A suitable vent is provided to permit the escape of air from the casing when the container is pushed in, and a compressible stop at the bottom of the casing limits the inward movement of the container. The compressed gasket is preferably vulcanized to the glass container along the line of contact, whereby the container is permanently attached to the supporting gasket. The resultant structure is a unitary heat-insulated receptacle of few parts and efficient operation.

Figure 1:
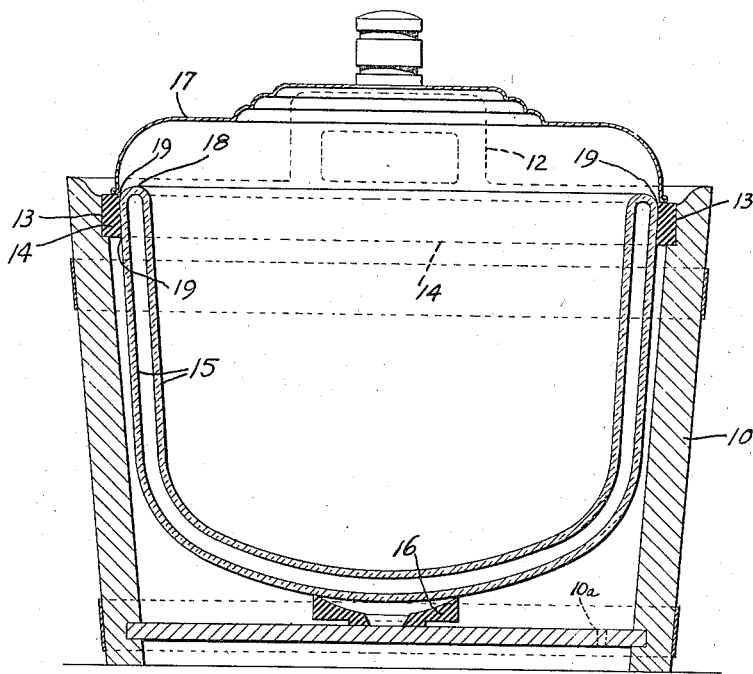
Figure 2:
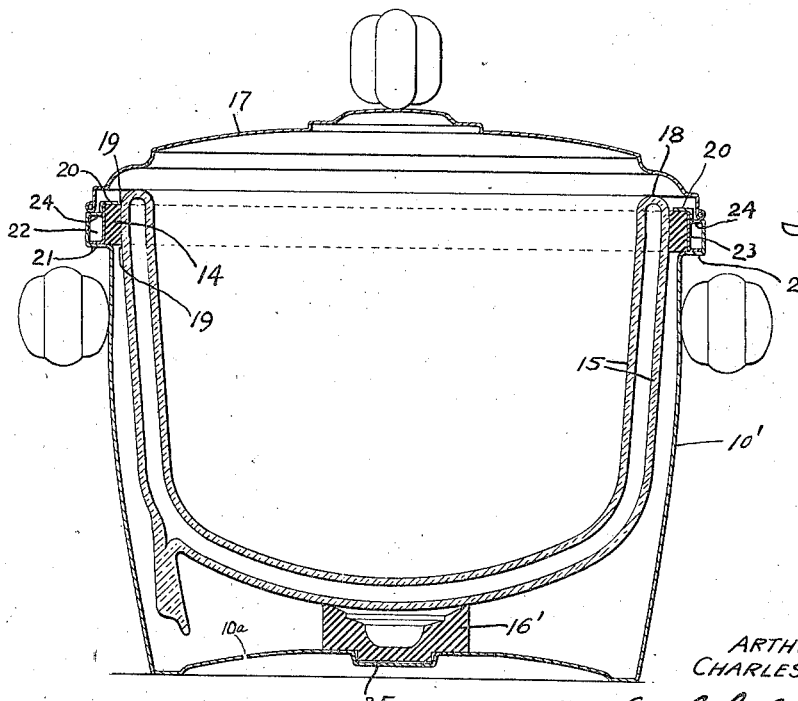

The construction and practical advantages of our new receptacle will be understood from a description of the accompanying drawing, in which Figs. 1 and 2 show two embodiments of our invention in vertical section.

Referring to Fig. 1, the outer casing 10 is a small wooden tub with a pair of integral handles 12. A circular groove or recess 13 holds an elastic compressible gasket 14, preferably of rubber, which may be secured in the groove in any practical way, as by cementing, although it will usually stay in place by friction when compressed. In the tub 10 is supported a double-walled tub-shaped container 15 of glass or other suitable material, the space between the walls being evacuated or otherwise rendered heat-insulating. The container 15 is suspended in the tub by means of the compressed rubber gasket 14, which is in permanent pressure contact with the container over the annular area 19, so that the container is firmly supported vertically and laterally. This supporting action is improved by causing the rubber and the glass of parts 14—15 to adhere along the line of contact, as presently to be more fully explained. The bottom of container 15 engages a compressible plug or stop 16, the primary purpose of which is to limit the inward movement of the container during the assembly of the parts. A cover 17, preferably of sheet metal, rests on the gasket 14 and encloses the projecting top rim 18 of the double-walled container 15.

The assembling of the parts is simple. The elastic stop 16 is placed centrally on the bottom of tub 10, being attached thereto if necessary, and the rubber gasket 14 is seated in groove 13. The inner face of the gasket or the outer wall of container 15, or both, are lubricated with a suitable substance, such as oil, liquid cement, liquefied rubber, and the like, and the container is now pushed past the rubber gasket into the tub. The groove 13 is of such size in relation to the thickness of the rubber gasket 14 and the outside diameter of the cylindrical container 15 that the rubber is compressed during the inward movement of the container, this forced insertion of the latter being facilitated by the lubricated surfaces of the contacting parts 14 and 15. As the tub is made water-tight, a suitable vent is provided for the escape of air out of the tub when the container is forced in, and this vent is subsequently closed. This temporary air vent may be formed in the tub, as indicated at 10a, or in the gasket itself. The compressible stop or plug 16, by pressing against the bottom of container 15, limits the inward movement of the latter and thus serves to gauge the space between the bottom of the tub and the bottom of the container. When the container is fully inserted in the tub, the top rim 18 thereof preferably projects slightly above the gasket 14, thereby holding the cover 17 in place.

The pressure of the compressed rubber gasket 14 against the inserted container 15 is sufficient to support the latter firmly in the tub, independently of stop 16, and this pressure causes the rubber to adhere to the glass wall of the container, which is thus permanently sealed to the gasket. The adherence of parts 14—15 is hastened by the action of the lubricating substance used to facilitate the insertion of the container into the tub, as previously described, this substance vulcanizing the compressed rubber gasket to the outer glass wall of the container in a leak-proof seal. The assembled structure is a unitary receptacle well insulated and especially useful in preserving ice cubes and the like in frozen condition.

The modification shown in Fig. 2 has a tub 10' of sheet metal, which is provided at the top with a pair of integral circular flanges 20—21 spaced to form an annular recess for holding the rubber gasket 14. If a narrow gasket is used, the outer space 22 is cut off by inserting an L-shaped ring 23 between the flanges 20—21, so that the gasket is held compressed between the ring and the container. Any other practical means may be employed to form a retaining groove in tub 10' for the gasket 14. The upper flange 20 does not touch the outer wall of container 15, so that the latter is heat-insulated from the metal of the tub. What has been said previously about the assembly of parts 14 and 15 applies fully to Fig. 2 without the need of repetition. The integral annular shoulder 24 surrounding the gasket 14 may also serve as a support for the cover 17. The limiting stop 16' may be an elastic pad of rubber, cork, and the like, mounted on the bottom of tub 10' and held in central position by entering a recess 25. In Fig. 2, as in Fig. 1, the heat-insulated container 15 is held out of contact with the walls of the tub, thereby improving the heat-insulating properties of the receptacle.

It will be clear from the foregoing description that we have devised a double-walled heat-insulated receptacle of simple construction and capable of preserving the temperature of the contents for a sufficiently long time. In particular, our new receptacle forms a highly efficient tub or bowl for keeping ice cubes ready for use. When we refer to the parts 10 (or 10') and 15 as bowl-shaped or tub-shaped, we mean any practical shape resembling a bowl or small tub.

Although we have shown and described certain specific constructions, our invention is not limited to the details set forth, for various changes and modifications are possible within the scope of the appended claims.

We claim as our invention:

1. A heat-insulated receptacle comprising a substantially tub-shaped outer casing having an annular groove at the top, a substantially tub-shaped double-walled container in said casing, there being a narrow annular space between the adjacent walls of the casing and container, a compressed rubber gasket seated in said groove and having a flat inner surface shaped to engage the top of said container in pressure contact sufficient to hold the container firmly suspended in the casing, the vertical depth of said gasket being greater than its horizontal thickness so as to engage the container along a relatively wide contact area for securely supporting the container, said rubber gasket being cemented in its compressed state to said container along the annular area of contact, whereby the container is permanently sealed to the gasket and locked against axial displacement in the casing, the circular top of the container being substantially flush with or projecting only slightly above the gasket, which is positioned to form a closure for the top of said annular space, and a compressible stop at the bottom of the casing to engage the bottom of the container and thereby gauge the space between the bottoms of the container and the outer casing, said gasket supporting the container in the casing independently of said stop.

2. A heat-insulated receptacle comprising a substantially tub-shaped outer casing having an annular groove at the top, a substantially tub-shaped double-walled container of glass in said casing, a compressed rubber gasket seated in said groove and having a flat inner surface shaped to engage the top of said container in pressure contact sufficient to hold the container firmly suspended in the casing, the vertical depth of said gasket being greater than its horizontal thickness so as to engage the container along a relatively wide contact area for securely supporting the container, said rubber gasket being cemented in its compressed state to the outer glass wall of the container along the annular area of contact, whereby the container is permanently sealed to the gasket and locked against axial displacement in the casing, and a compressible stop at the bottom of the casing to engage the bottom of the container, which is thereby properly spaced from the bottom of the casing said gasket supporting the container in the casing independently of said stop, the top rim of said container extending slightly above the gasket which is exposed on top to engage and support a cover above the container, said cover enclosing the double-walled top rim of the container, the extending portion of said top rim forming an annular shoulder which holds the cover against lateral displacement.

3. A heat-insulated receptacle comprising a substantially tub-shaped outer casing provided at the top with an annular groove, a rubber gasket held in said groove, a substantially tub-shaped double-walled container supported in said casing by said gasket which engages the container at the top with sufficient pressure, the vertical depth of said gasket being greater than its horizontal thickness so as to engage the container along a relatively wide contact area, the circular top of the container being substantially flush with or projecting only slightly above the gasket, which is maintained in compressed state by the container and cemented thereto in a sealed contact whereby the container is sealed to the gasket and locked against axial displacement in the casing, and a compressible stop at the bottom of the casing to gauge the bottom spacing of the container from the casing, said gasket supporting the container in the casing independently of said stop, said gasket and stop holding the container out of contact with the walls of the outer casing, said gasket being positioned to form a closure for the top of the annular space between the casing and container.

4. A heat-insulated receptacle comprising a substantially tub-shaped outer casing of sheet metal, which is shaped at the top to provide an annular groove, a rubber gasket held in said groove, a substantially tub-shaped double-walled container supported in said casing by said gasket which engages the container at the top with sufficient pressure, the vertical depth of said gasket being greater than its horizontal thickness so as to engage the container along a relatively wide contact area, the circular top of the container being substantially flush with or projecting only slightly above the gasket, which is maintained in compressed state by the container and cemented thereto in a sealed contact whereby the container is sealed to the gasket and locked against axial displacement in the casing, a compressible stop at the bottom of the casing to gauge the bottom spacing of the container from the casing, said gasket supporting the container in the casing independently of said stop, said gasket and stop holding the container out of contact with the metal walls of the outer casing, said gasket being positioned to form a closure for the top of the annular space between said casing and container, and an integral annular shoulder at the upper end of said casing to support a cover above the container, said cover enclosing the double-walled top rim of said container.

ARTHUR H. PAYSON.
CHARLES O. DUEVEL, Jr.